(12) United States Patent
Näs

(10) Patent No.: US 7,224,641 B2
(45) Date of Patent: May 29, 2007

(54) SENSOR ARRANGEMENT AND METHOD FOR THE INSTALLATION AND MOVING OF THIS

(75) Inventor: Johan Fredrik Näs, Trondheim (NO)

(73) Assignee: Seabed Geophysical AS (NO)

( * ) Notice: Subject to any disclaimer, the term of this patent is extended or adjusted under 35 U.S.C. 154(b) by 0 days.

(21) Appl. No.: 11/314,381

(22) Filed: Dec. 21, 2005

(65) Prior Publication Data

US 2006/0140053 A1    Jun. 29, 2006

(30) Foreign Application Priority Data

Dec. 27, 2004    (NO)    ................................ 20045667

(51) Int. Cl.
*G01V 1/38*    (2006.01)
(52) U.S. Cl. .......................... 367/15; 367/16
(58) Field of Classification Search ................. 367/15, 367/16
See application file for complete search history.

(56) References Cited

U.S. PATENT DOCUMENTS 4,516,227 A * 5/1985 Wener et al. .................. 367/15
5,253,223 A * 10/1993 Svenning et al. ........... 367/178
6,657,921 B1 * 12/2003 Ambs ........................... 367/20

FOREIGN PATENT DOCUMENTS

WO    WO 2004/053526 A1 *    6/2004
WO    WO 2005/071442 A2 *    8/2005

* cited by examiner

*Primary Examiner*—Mark Hellner
(74) *Attorney, Agent, or Firm*—Thomas L. Adams

(57) ABSTRACT

Arrangement for use for seismic surveys of geological formations in a seabed, where a plurality of such arrangements, which are provided with sensor units 26, are placed on the seabed for collecting pressure waves and shear waves reflected from the geological formations. There exist arrangements for transferring seismic data to a surface receiver placed on a vessel, an offshore installation, or an onshore installation. Each sensor unit 26 is held by a carrier 10 and is connected to a cylindrically skirt-shaped structure 19 adapted to be led down into the seabed, and each sensor unit 26 comprises at least one geophone. The carrier 10 comprises a holder 12 for the cylindrically skirt-shaped structure 19, which structure 19 shall penetrate down into the seabed, as this holder 12 is adapted to be moved between a lower position and an upper position, to be able to be mechanically released from the skirt-shaped structure 19.

13 Claims, 5 Drawing Sheets

SENSOR ARRANGEMENT AND METHOD FOR THE INSTALLATION AND MOVING OF THIS

BACKGROUND OF THE INVENTION

1. Field of the Invention

The present invention relates to a sensor arrangement as indicated in the introduction of claim 1, for use on the seabed. Such sensor arrangements may be used, permanently or temporarily installed on the seabed, for surveillance of petroleum reservoirs and adjacent well systems.

The invention also relates to a method for the installation and moving of seismic sensor arrangements on the seabed.

2. Description of Related Art

To be able to perform seismic surveys of formations below the sea, a plurality of sensor nodes are placed on the seabed, preferably in a regular disposition. These sensor nodes must be in contact with a solid medium, leading to requirements for the deployment operation. From Norwegian Patent Application No. 20025896, an arrangement is known, in which to each sensor node is connected a remotely operated control and registration unit for telemetric transmission of data to a control center, which is arranged in an above-water receiver.

In another embodiment, on the same basis, the registered data is transferred by either picking out the storage medium physically, or by transferring the data on the storage medium through a temporary, externally connected cable connection. The sensor arrangement is run by an internal battery, and the time reference for the seismic measurements is an internally arranged clock, with very good long term stability.

For the deployment of a plurality of such sensor nodes, each sensor node is provided with a handle or a bracket that can be grasped by the gripping means of a remotely operated vehicle (ROV) or a remotely operated tool (ROT). Each sensor node, with appurtentant control and data registration unit (CDU), is then lowered down onto the seabed with a crane. In good conditions, the surface vessel can control the position of the deployment with an accuracy of within a few meters. An ROV is then used, primarily for moving the sensor node from a parked position on the CDU to a free position on the seabed. The ROV may possibly be used to correct the position of the sensor arrangement, and to release the crane attachment. In this operation, the ROV may be used to arrange the sensor node in the correct position. This solution may function well for installations with a limited time duration, in the order of one month, but it becomes less feasible when substantially longer installation times are required. Typical areas of application for such seismic sensor installations may be the monitoring of oil and gas reservoirs over time (e.g. 10–15 years), including well paths during drilling and operation.

An available method for realizing such a "permanent" seismic sensor installation is to dig one or more sensor cables down into the seabed. Via a system of connection cables, the cable installation is provided with time reference, instructions, and energy. Collected data from each individual registration unit in the cable is led through common lines, up to a centrally placed data storage medium, normally placed above the sea surface. The embedment process is necessary to achieve good acoustic coupling between sensors and seabed, prevent unwanted relocation due to hydrodynamic influence, as well as to protect the cable against damages from, for instance, trawling or any other external influence. The embedment process typically consists of forming kilometers of ditches in the seabed, into which the cable strings are placed. This may represent substantial and lasting environmental interventions in the seabed biotope, and require the use of large, energy consuming, and air pollutive equipment during the embedment process. The cost associated with the embedment will typically be in the same order of magnitude as the value of the entire cable installation. The cables cannot be laid over existing obstructions on the seabed or in areas where future underwater installations are planned. Furthermore, it turns out that in practice, it is difficult to maintain/repair the buried parts of the cable system without having to dig them out again. A cable system which is not maintained will typically detonate within a few years due to electric failure and water intrusion. Depending on the type of failure in the cable, the failure may have consequences for parts of the cable that are downstream in relation to the position of the failure. If one, on the other hand, moves a cable to the surface for maintenance and repairs, it will be a challenge replacing it later in the exactly same position as before, and with the same acoustic coupling to the seabed as the original coupling. Both factors are particularly important, for instance, for observing small changes in the reservoir characteristics through time. It will also imply substantial risk of damaging cables that must be raised up again.

From US patent publication U.S. Pat. No. 6,474,254 (WesternGeco, 2002) it is known to deploy cables with attached sensors in a network on the seabed, but this requires the application of a remotely operated vehicle (ROV), and provides no possibility for the repair of individual sensors.

From NO patent publication 168622 (Den norske stats oljeselskap, 1991), a seismic cable arrangement is known, where a series of torpedo-shaped sensor arrangements are attached to a signal cable. These arrangements are deployed in a pattern on the seabed by means of a remotely operated vehicle (ROV). This solution has not proven to be satisfactory from a deployment and application point of view.

From NO Patent Application 20025831 (Institute Francais du Petrole, 2003) a system for seismic data collection is known, where sensor arrangements are placed onto the seabed by releasing them, allowing them to free fall, resulting in torpedo-shaped penetration down into the seabed. This equipment does not satisfactorily provide the possibility for the placement in a substantially permanent network of sensor arrangements with a cable connection to the individual units. Neither does this provide satisfactory possibilities for maintenance and repairs.

SUMMARY OF THE INVENTION

The main object of the invention is, therefore, to provide an arrangement that provides for an effective, reliable seismic monitoring method for petroleum fields, both as an aid during the establishment phase and in the further management of the field resources throughout the life time of the field. The intention of the invention is to provide a substantial reduction of the disadvantages that may be related to known methods and equipment. More specifically it is an object to create a system that makes possible that the position and the acoustic coupling to the seabed of the individual sensor nodes can remain constant throughout the entire system lifetime, a substantial reduction of environmental disadvantages with respect to installation and operation, a substantial reduction of the costs in connection with installation, compared to buried sensor cables, a possibility of preventive maintenance with substantially lower costs than for corresponding systems with buried sensor cables, management of non-planned maintenance/failure correction without substantial loss of continuous system integrity, a substantial reduction of security risk for involved personnel during installation and operation, due to less personnel-intensive operations (less and smaller vessels) and better accessibility at planned maintenance, an average system integrity of more than 90% during periods with seismic data collection, due to the solution being modular, error tolerant, and having good maintainability, substantially reduced need for ROV assistance during installation of the sensor nodes, by using mainly crane operation from a boat, reduction of the risk of being intercepted by trawls and similar fishing equipment.

The invention is described in claim 1. The carrier described in the introduction of claim 1 comprises a holder for the cylindrical skirt-shaped structure that shall penetrate down into the seabed. This holder is adapted to be moved between a lower engagement position with the skirt-shaped structure, and an upper position, where it is mechanically disengaged from the skirt-shaped structure.

A layout of a larger or smaller number of node-based sensor arrangements may be used, if placing and mutual configuration is chosen on the basis of geophysical measurement criterias, existing obstructions on the seabed, and plans for further field development. A larger or smaller part of the deployed units are connected to an adapted cable network deployed on the seabed. This cable network can be connected to the existing infrastructure of the petroleum field, or alternatively to a separate network system between seabed and surface. Via this network system, the system of sensor arrangements on the seabed can receive charging current for the batteries, instructions, and time reference from the surface, as well as sending collected seismic data and status information back to reception centers, located above water.

Errors on certain sensor units will not result in any consequence for the rest of the system. Sensor arrangements that are being repaired due to failure or for some other reason shall undergo maintenance, can be brought to the surface for maintenance and be replaced by another sensor arrangement without the loss of the absolute position or existing acoustic coupling of the sensor node to the seabed. The following description of the invention will explain this relation further.

During failure on the cable network, the sensor units will continue to collect seismic data, limited in time by the remaining capacity of the local battery and data storage medium. When the failure on the cable network is repaired, the stored seismic data in the sensor units can again be transferred. Provided that the battery and data storage medium have sufficient capacity, repairs of unforeseen failures and maintenance can be performed without the loss of data.

The invention also comprises a method as stated in claim 10, for the deployment of a sensor unit on the seabed for seismic surveys, where a carrier arrangement is lowered and placed onto the seabed to carry the sensor unit, and where a tube-shaped element is forced down into the seabed, to capture pressure waves and shear waves that are reflected from the geological formations, whereby seismic data generated in this manner is transferred to a surface receiver for storage and processing. After forcing down the tube-shaped element into the seabed, the carrier arrangement is released from the element, as at least the contact part of the carrier arrangement against the tube-shaped element is elevated away from contact with the element.

Details of the invention are stated in the claims 2–9 and 11–13.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein:

FIG. 3 illustrates an enlarged section of the central part of the sensor node, with a released drawback, whereas FIGS. 4 and 5 perspectively illustrate two phases of the interconnection of a sensor unit with a tube-shaped blade, while

DETAILED DESCRIPTION OF THE PREFERRED EMBODIMENTS

Figure 1:
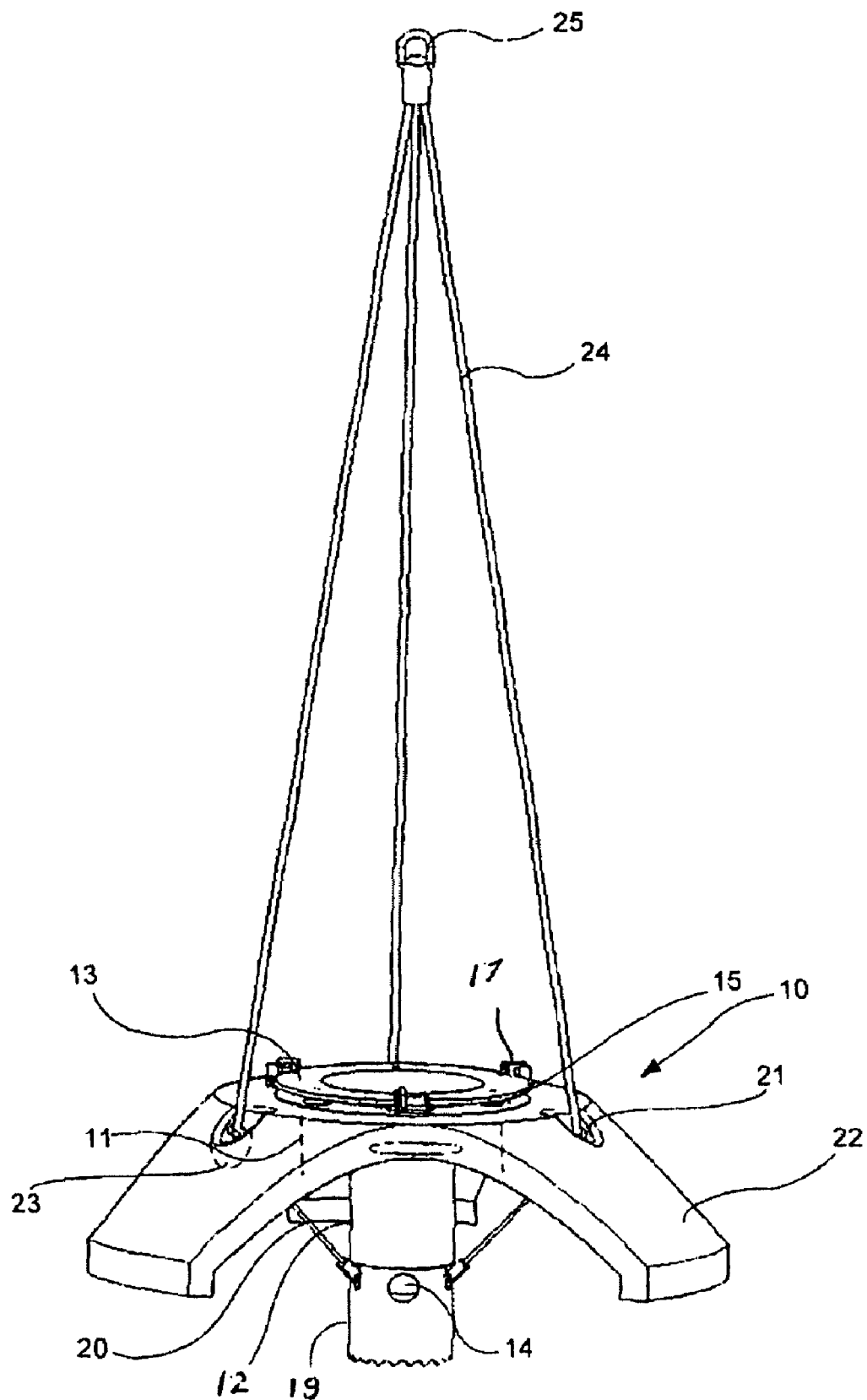
FIG. 1 illustrates a perspective view of an embodiment of a sensor node according to the invention.
Figure 2:
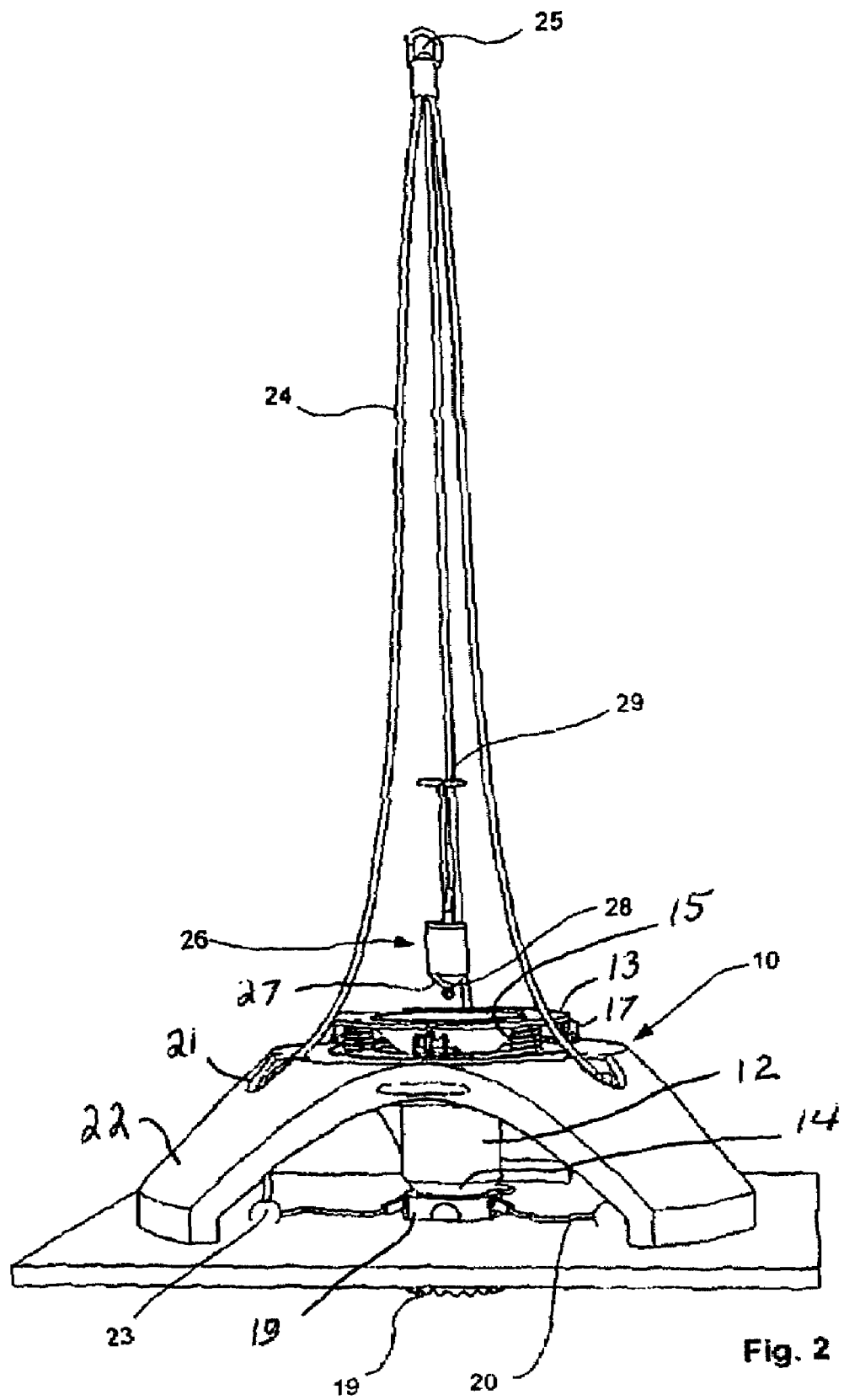
FIG. 2 illustrates the sensor node of FIG. 1, after deployment on the seabed, with a schematic representation of a sensor unit during deployment.
Figure 3:
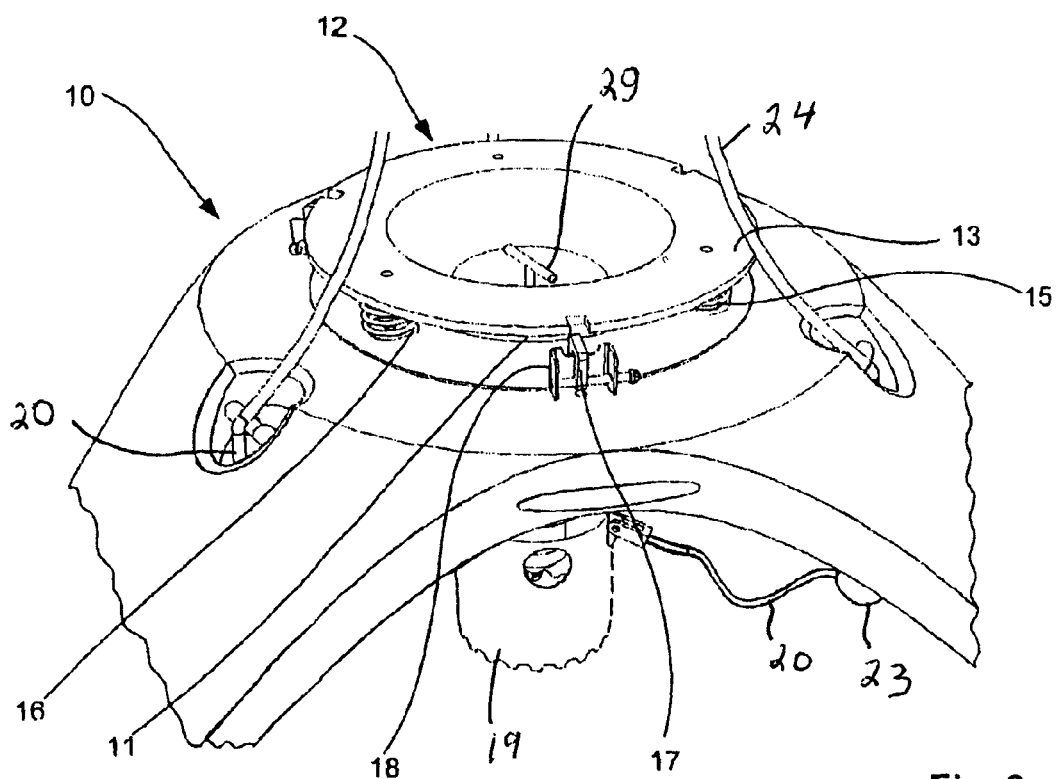

Referring to FIGS. 1–3, a sensor arrangement or sensor node is shown, with a carrier arrangement or carrier in the form of a three-legged stand 10 with a vertical main axis, made of, for instance, reinforced concrete. In a hole 11 along the main axis, a tube-shaped drawback 12 is placed, with a projection 13 on the top and a tapered, open constriction 14 at the bottom. The drawback 12 is held by four helical springs 15 (FIG. 3), placed between the projection 13 and recesses 16 in the top of the stand 10. At the starting point, the drawback is biased downwardly against the springs, by releasable locking lugs 17, which are secured to brackets 18 on the top side of the stand 10.

At the lower edge of the tapered constriction 14, a tube-shaped blade 19 with a vertical main axis is placed in mechanical contact with the constriction 14. The shape of the top of the blade 19 is adapted to the drawback 12, the main axes are coincident and relative rotation between these parts are hindered. The shape of the lower edge of the blade 19 can be of sawtooth shape for easier penetration into the seabed.

The tube-shaped blade 19 is held in place below the drawback 12 by three elastic straps 20, which extend through their own hole 21 in three legs 22 that spread out in a christmas-tree shape from the central part of the stand 10. The straps 20 are, at the upper end, provided with their own weight 23, which is placed below the stand 10, and which forms fastening for lifting lines 24 that extend up to a lifting ring 25. When lifting with the lifting ring 25, the weights 23 impinge on the underside of the stand 10.

The illustrated layout can be managed and launched with a crane from a seagoing vessel or a fixed installation, via a system of straps, ropes, or the like.

The tube-shaped blade 19 is mounted to project downwardly in relation to the lower side of the legs 22 of the stand 10. When the system is lowered down onto the seabed, the blade 19 will be forced into the seabed by the total weight of the lowered system, as illustrated in FIG. 2. By adapting the system weight and the shaping of the tube-shaped blade 19 to how hard/compact the seabed is, the blade can, in most cases, sink into the seabed its full length. If special conditions exist on the seabed (for instance very hard/compact), which makes it difficult to force in the tube-shaped blade 19, the blade 19 can additionally be made to fluctuate about the main axis by weakly exciting the drawback 12 with a suitable frequency about its main axis. The excitation can, for instance, be provided by an ROV-based supply.

The straps 20 will hold the tube-shaped blade 19 in place and prevent it from falling off the drawback 12 when the system is lifted. When the tension in the straps 20 ceases, after the system has been deployed onto the seabed, as shown in FIG. 2, the weights 23 will sink down onto the seabed and the tension in the straps 20 will cease completely. If desired, the juncture, i.e. the lifting ring 25, can be provided with a buoyant body, which is sufficiently large to keep the straps 20 up, but sufficiently small not to lift one single weight 23.

When the system stands parked on the seabed, the hook is released from the lifting ring 25. Further, the locking lugs 17 are released. Because of the tension in the springs 15, the drawback 12 will be lifted a little. The mechanical contact between the tube-shaped blade 19 and the drawback 12 will thus be cut off. The unwanted mechanical contact between the blade 19 and the rest of the system is now substantially weakened, which is one of the main effects of the invention.

A seismic sensor unit 26, typically containing three orthogonal geophones or accelerometers, a hydrophone, and a dual axis inclinometer, is released down through the top of the drawback 12, so that it rests on top of the tube-shaped blade 19. The housing of the sensor unit 26 has a mainly cylindrical shape with a tapered point 28, which fits accurately into a correspondingly tapered geometry at the top of the blade 19. For the possibility to further secure a stable mechanical connection, the sensor unit 26 may, for instance, be equipped with a locking device. The opening in the bottom of the drawback 12 is so big that the sensor unit 26 and the drawback 12 are not in physical contact when the sensor housing is parked down into the top of the blade 19. Because of the shaping of the system, the sensor unit 26 can be put in place, either in connection with the stand 10 with the tube-shaped blade 19 being lowered down onto the seabed, or as a separate operation, after the stand 10 with the tube-shaped blade 19 has already been lowered down into the desired position. If the sensor unit 26 is post-mounted, this can occur as an ROV intervention task. The sensor unit 26 is shown with a T-shaped gripping handle 29 that can be grabbed by a remotely operated vessel.

Figure 4:
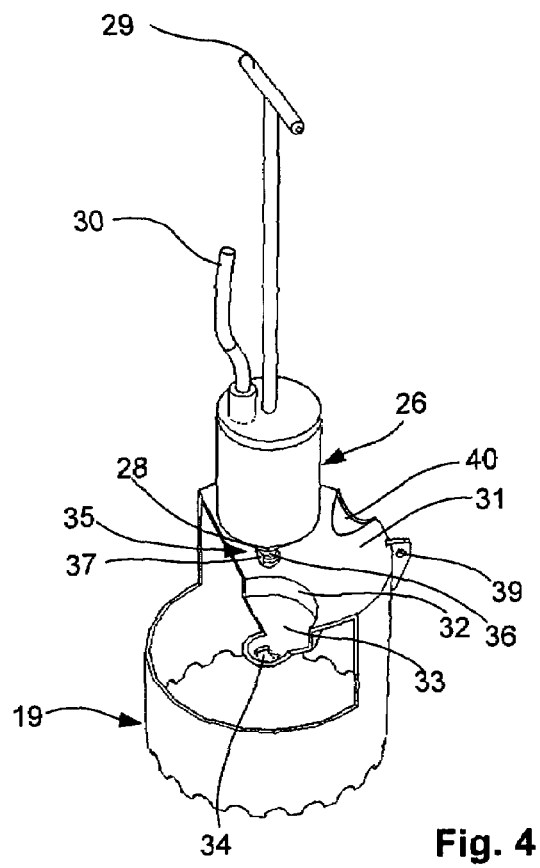

FIG. 4 illustrates a sensor unit 26 with upwardly extending handle 29 and an outgoing cable 30 in position for being led down into a tube-shaped blade 19, for instance by means of an ROV that can grab the handle. The tube-shaped blade 19 has a funnel-shaped wall 31 that extends downwardly from the upper edge towards a graduation 32 with a transition to another funnel-shaped bottom 33 with a central, slit-shaped hole 34. The funnel-shaped bottom 33 can form a foundation for the point 27 of the sensor unit 26. The point 27 of the sensor unit 26 has an outwardly extending, cylindrical tap 35 with a ring groove 36 at the foot, with a rounded end and with opposite side-flattenings 37 that correspond to the hole 34.

Figure 5:
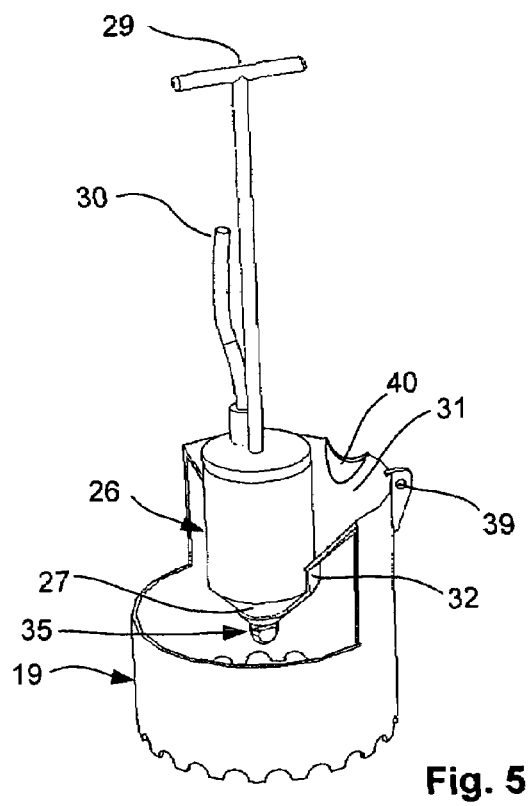

FIG. 5 shows how the sensor unit 26 fits into place with the tap 35 through the hole 34. After turning 90° with the handle 29, the ring groove 36 will be turned into engagement with the edges of the hole 34 and lock the sensor unit 26 to the tube-shaped blade 19.

The tube-shaped blade 19 has three fastening brackets 39 distributed around the circumference for securing of the straps 20.

FIG. 5 also shows three recesses 40 distributed around the circumference, for fastening of the straps 20. They form holes for the water inside the skirt to be forced out of when the skirt is forced down into the seabed. Without the recesses 40, the sediment on the inside of the skirt would have a tendency to cavitate out if the water would have to flow out via the skirt edge. The result would be a poor acoustic coupling to the seabed.

The sensor unit 26 may also be put into place with contact with the tube-shaped element before this is released from the carrier arrangement.

Figure 6:
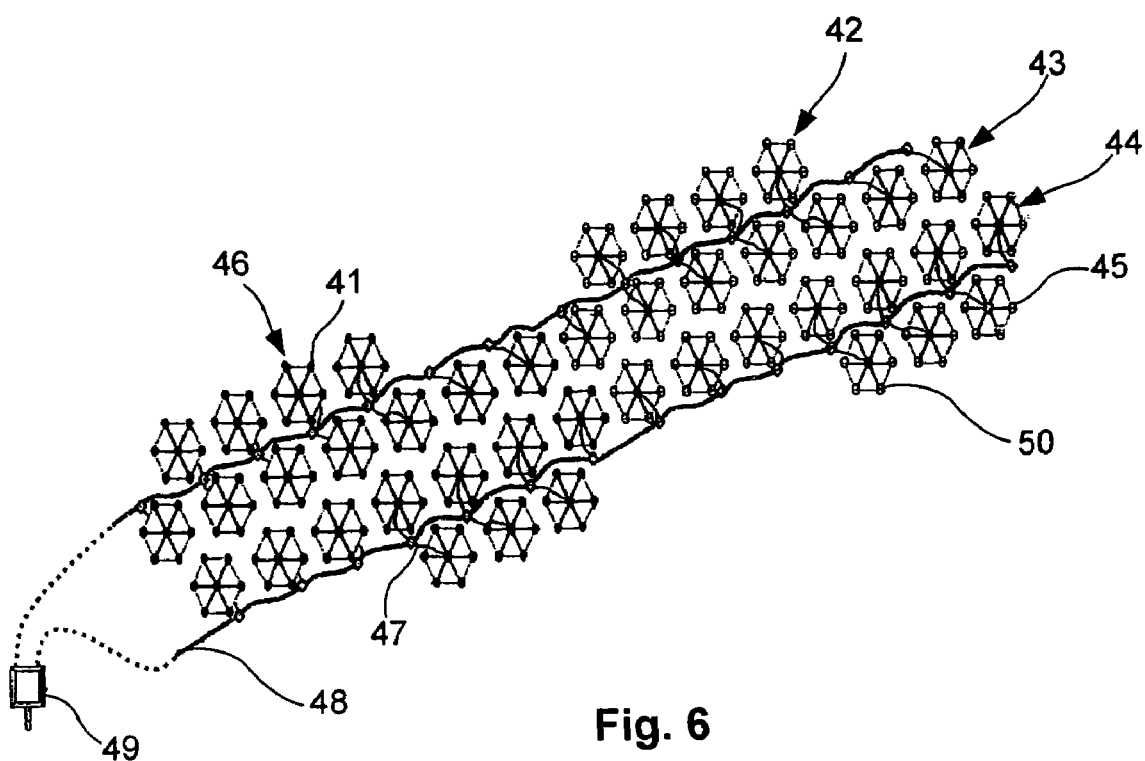
FIGS. 6 and 7 illustrate two alternatives for the formation of a network of sensor nodes, according to the invention.

FIG. 6 illustrates a system of a plurality of seismic sensor arrangements of the same type as described in FIG. 1–3. In this example, two double rows 42, 43 and 44, 45 of sensor groups 46 are shown, where each sensor group 46 comprises seven sensor arrangements 41 placed in a star-pattern with interconnection to a common serving-cable 47. The serving-cables 47 for each double row is connected to a common main cable 48, which is led out to a juncture for data communication and power supply 49.

As an alternative to the illustrated fixed cable network, some of the separate sensor units may be non-connected (autonomous).

To save on equipment investment, a larger or smaller number of the sensor positions can, as a starting point, be installed without sensor units 26 (represented by the empty circles 50 in FIG. 6). The invention allows for the sensor units 26 to a) be moved between different positions and b) be replaced by others when maintenance/repairs is required—without this resulting in changes in the sensor unit's absolute position or acoustic coupling to the seabed.

Figure 7:
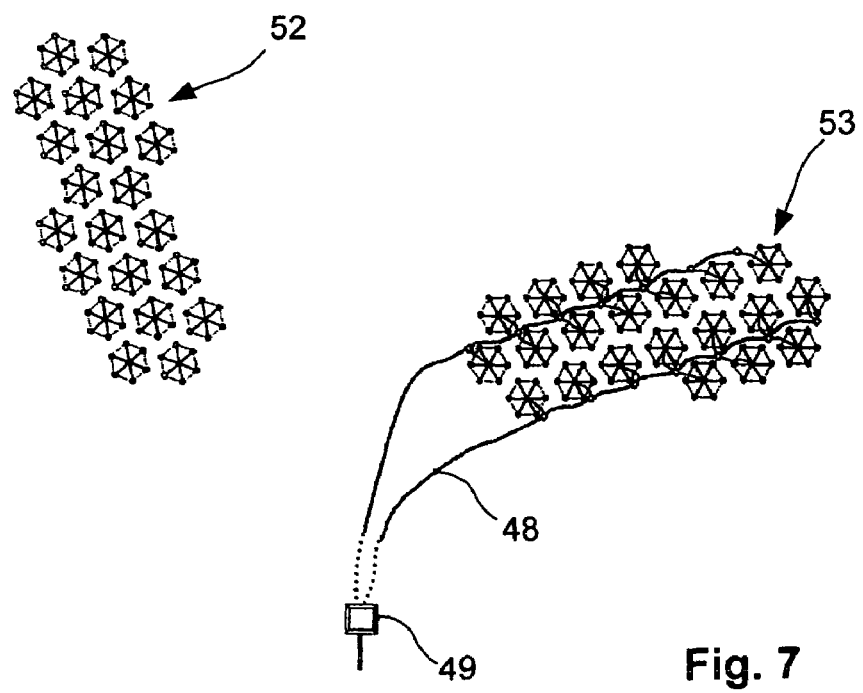

FIG. 7 illustrates an alternative configuration of sensor positions, where one part 53 is connected to a cable network, whereas the other part 52 is not. Data collected by sensor devices placed in the network can be sent directly to a centrally placed receiving station, for instance onshore. Units which are not connected to a network, must either be brought to the surface, or to a sensor position on the seabed with network connection, to have its data transferred. Thus, the invention makes time sharing of costly sensor equipment and network arrangement on the seabed possible. The invention also makes maintenance and repairs possible on separate parts of the system, without this having considerable consequences on the performance of the rest of the system.

The invention can also be used for non-permanent installations without network connection. Simple mechanical equipment can be deployed on the seabed, which can be used with flexibility according to requirements. The carrier 10 can stand by for several years, and it is possible to obtain the same position and sensor response for future use. All components having a need for maintenance, such as sensor units and cables, can be easily replaced without reduction in data quality.

The carrier 10 has a shape that protects against overtrawling. The design with three legs 22 results in a stable placement on the seabed. It will not cause cavitation of the seabed and has a generally low flow-resistance.

It is not necessary to connect each sensor node to the juncture 49, as they instead can be connected through junctures along the cables 48.

The invention claimed is:

1. Arrangement for use for seismic surveys of geological formations in a seabed, where a plurality of such arrangements are placed on the seabed for collecting pressure waves and shear waves reflected from the geological formations, and are adapted to transfer seismic data to a surface receiver placed on a vessel, an offshore installation, or an onshore installation, each arrangement comprising:
   a sensor unit;
   a carrier for holding the sensor unit;
   a cylindrical skirt-shaped structure adapted to be connected to the sensor unit and to be led down into the seabed, and where each sensor unit comprises at least one geophone, wherein the carrier comprises
   a holder for the cylindrically skirt-shaped structure, which structure shall penetrate down into the seabed, this holder being adapted to be moved between a lower position and an upper position, to be able to move away from and be mechanically released from the skirt-shaped structure.

2. Arrangement according to claim 1, wherein the holder is tube-shaped and positioned in a central opening in the carrier.

3. Arrangement according to claim 2, wherein the holder has a lower tapered constriction and an upper projecting flange that covers the central opening in the carrier.

4. Arrangement according to claim 3, wherein the edge of the tapered constriction in the lower position of the holder forms a contact face for the skirt-shaped structure that, in use, penetrates into the seabed during the deployment of the arrangement, as the skirt-shaped structure is held in contact with the edge of the constriction by means of at least two elastic string organs that extend downwardly from the carrier.

5. Arrangement according to claim 4, wherein the upper edge of the skirt-shaped structure and the edge of the constriction have rotation-preventing engagement elements.

6. Arrangement according to any one of claims 1–5, wherein the skirt-shaped structure has an engagement and locking element for keeping a sensor unit fixed and with mechanical contact, for the transfer of movements from collected waves.

7. Arrangement according to any one of the claims 1–5, wherein the cylindrically shaped holder is biased towards its upper position by two or more helical springs that are positioned between the upper side of the carrier and the lower side of the flange, as the flange is held depressed by two or more grabbing paws secured to the carrier.

8. Arrangement according to claim 4, wherein the elastic string organs are adapted for releasing the skirt-shaped structure, as they are connected with their own lifting line for handling of the carrier.

9. Arrangement according to claim 8, wherein the lifting lines are led through their own opening in the carrier and that they are connected with the elastic string organs to elements, especially balls, which during lifting form contact faces below the openings.

10. Method for deployment of a sensor unit for seismic surveys on the seabed employing a carrier arrangement and a tube-shaped element, comprising the steps of:
    lowering down and placing the carrier arrangement on the seabed to carry the sensor unit,
    forcing down the tube-shaped element into the seabed to collect pressure waves and shear waves reflected from geological formations, as seismic data generated in this fashion is transferred to an above-water receiver for storage and processing,
    releasing the carrier arrangement from the tube-shaped element, after the forcing down of the tube-shaped element into the seabed, wherein at least a contact face of the carrier arrangement against the tube-shaped element is elevated from contact with this the tube-shaped element.

11. Method according to claim 10, wherein the element on the carrier arrangement, which holds the tube-shaped element during the forcing down into the seabed, after the downforcing is elevated by elastic elements with respect to the carrier arrangement.

12. Method according to claim 10 or 11, wherein the sensor unit is lowered down into contact against the tube-shaped element, which is forced down into the seabed, after this has been released from the carrier arrangement.

13. Method according to claim 10 or 11, wherein the sensor unit is put into place with contact against the tube-shaped element before this is released from the carrier arrangement.

* * * * *